May 26, 1936.    R. F. WILSON    2,041,988
TIRE REPAIR PATCH
Filed Oct. 21, 1933    2 Sheets-Sheet 2

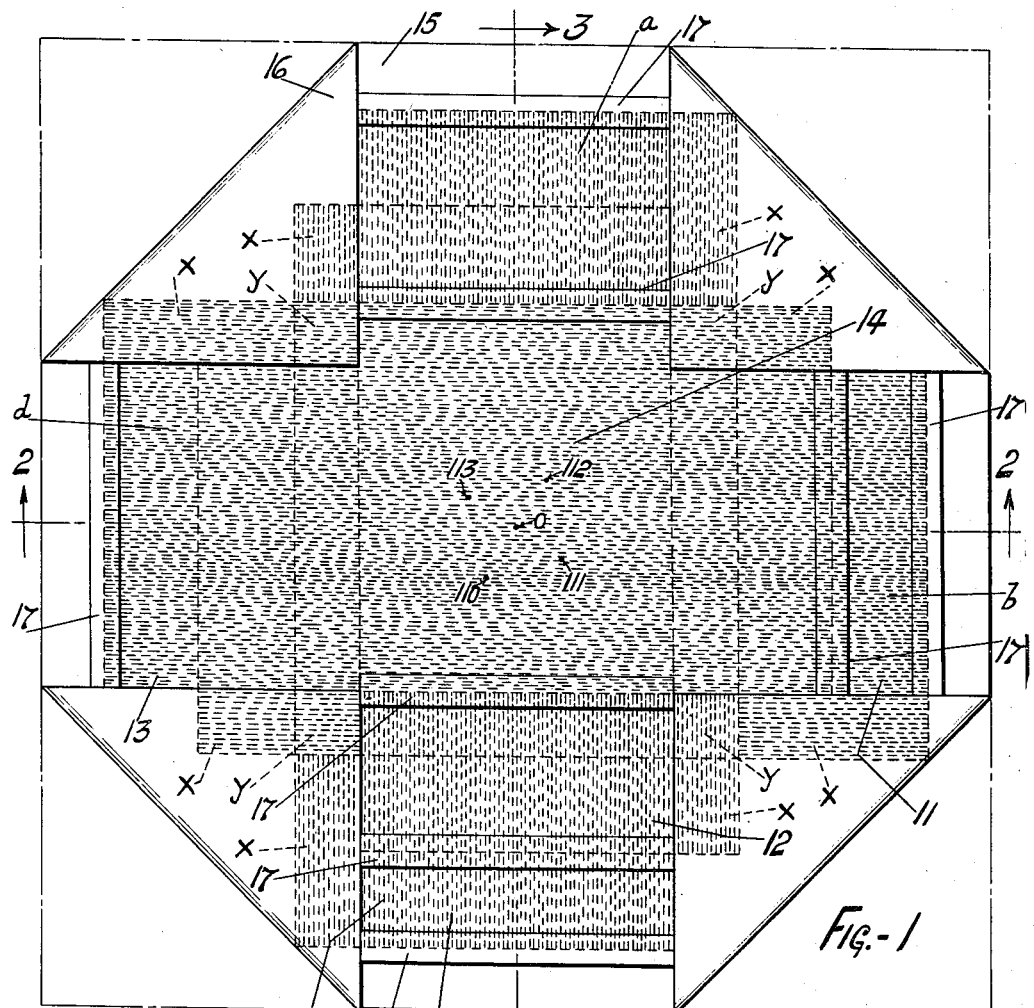

INVENTOR
ROBERT F. WILSON
BY
Ely & Barrow
ATTORNEYS

Patented May 26, 1936

2,041,988

UNITED STATES PATENT OFFICE 2,041,988

TIRE REPAIR PATCH

Robert F. Wilson, Akron, Ohio, assignor to The Firestone Tire & Rubber Company, Akron, Ohio, a corporation of Ohio Application October 21, 1933, Serial No. 694,631

6 Claims. (Cl. 152—26)

This invention relates to tire repair patches or the like, such as the patches used interiorly of tire casings to reinforce the same where the strands thereof have been ruptured, and more especially it relates to tire repair patches composed of strips of cord fabric disposed at right angles to each other.

In some respects the invention is an improvement upon the tire patch shown in the patent to Semler, No. 1,692,054, in that strips of cord fabric are used, the patch of the present invention having a plurality of cord strips arranged at right angles to each other. Repair patches of the latter type as heretofore constructed contained fabric strips of various lengths and widths for the purpose of providing the stepped or offset margins necessary to obtaining the desirable marginal thinness and flexibility.

The chief objects of this invention are to provide economy of construction in the manufacture of repair patches of the character mentioned; and to provide a patch of greater flexibility than heretofore provided. More specifically the invention aims to provide a repair patch composed of a plurality of cord plies of uniform size and shape so arranged as to provide flexible marginal portions in the finished patch. Other objects will be manifest.

Of the accompanying drawings:

Figure 1 is a plan view of a tire repair patch embodying the invention in its preferred form;

Figure 2 is a section on the line 2—2 of Figure 1;

Figure 3 is a section on the line 3—3 of Figure 1;

Figure 4:
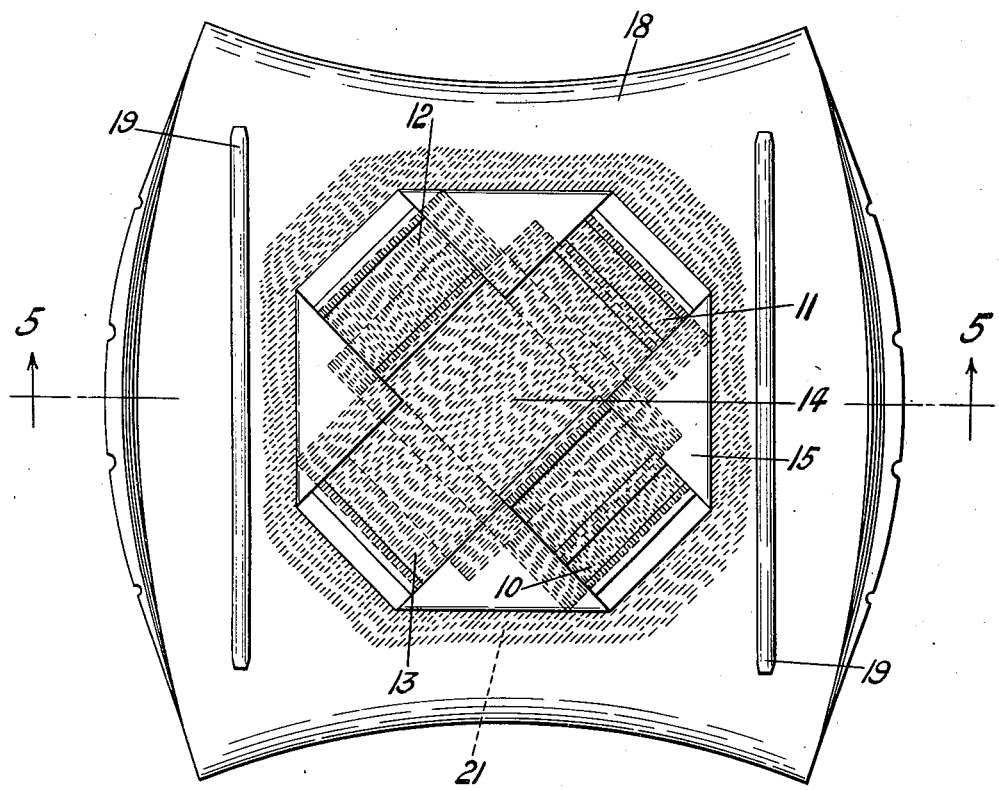
Figure 4 is a view of the inside of a section of a tire casing having the beads thereof spread apart to illustrate the improved patch mounted therein.

Referring to Figures 1 to 3 of the drawings, the improved repair patch shown therein comprises four strips of rubberized cord fabric 10, 11, 12, and 13, which strips preferably are previously vulcanized and provided on one side with a facing of unvulcanized rubber. All of the strips are of rectangular shape and are identical in size, the cords of the respective strips being disposed longitudinally thereof. The strips are assembled in superposed relation so that the cords of each strip are disposed at right angles to the adjacent strip or strips, the assembled structure being substantially cross shape. Those strips which have their cords disposed in the same direction are laterally and longitudinally offset with relation to each other. Thus the center of each strip is offset from the center of the finished structure, and the centers of the respective strips designated 110, 111, 112 and 113 respectively are symmetrically disposed about the center O of the finished structure and the latter is substantially symmetrical in shape.

The arrangement is such as to provide a patch having a central body portion 14 of four ply thickness, said body portion being of such area as properly to cover an injury in a tire casing. The strips 10 to 13 are of sufficient length to provide four tabs a, b, c and d respectively for securing the patch in a tire, said tabs being of three ply thickness adjacent the body portion 14, two ply thickness in their intermediate regions, and one ply thickness at their outer ends. Because of the lateral offset of the parallel strips, each tab a, b, c, d has opposite lateral marginal portions x, x of single ply thickness, the intersections of said marginal portions forming small areas y, y of two ply thickness. The marginal portions x on one side of the tabs are of different length than those on the other side of the tabs, in which respect only the patch is not symmetrical.

The patch is mounted upon a sheet of unvulcanized rubber composition 15 that is backed by a sheet of non-sticking fabric 16 known as holland cloth. The rubber sheet 15 and backing 16 are initially square in shape, as indicated by the broken lines in Figure 1, and somewhat larger than that portion of the patch composed of cord strips, the four corners of the said sheet 15 and its backing being folded upon themselves so as to overlie the marginal portions x and y of the respective tabs a, b, c and d as shown. Strips of unvulcanized rubber 17, 17 preferably are overlaid upon the exposed edges of the cord strips.

Figure 5:
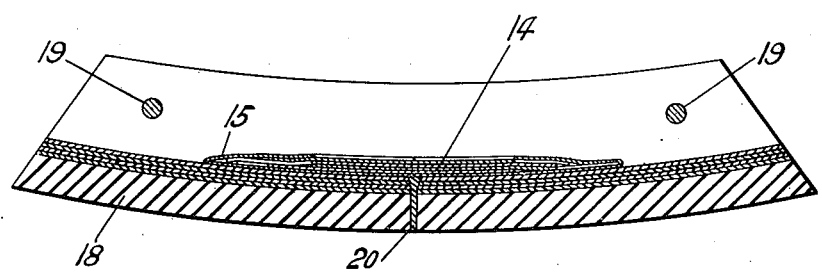
Figure 5 is a section on the line 5—5 of Figure 4.

The manner of applying the patch to a tire casing is shown in Figures 4 and 5 wherein 18 designates a tire casing, the bead portions of which have been spread apart by members 19, 19 for clearness of illustration. In Figure 5 at 20 is shown a typical injury to the tread and the fabric plies of a tire, which injury is repaired in the usual way by filling it with cushion rubber before the patch is applied. The inside of the tire casing is prepared for reception of the repair patch by trimming the rough edges of the injury to prevent chafing, and by applying cement to the surface area of the tire to be covered by the patch.

The holland cloth is then stripped from the patch, and the latter applied to the cemented tire surface, after the cement is dry, and firmly stitched in place. In mounting the patch, the under strip 10 thereof is arranged at right angles to the cords of the inner ply of the tire, as indicated at 21, Figure 4, so that the plies of the body 14 of the patch will alternate in the same order as the plies in the tire and will work therewith under the action of the load. Preferably the patch is vulcanized into the tire so as to become an integral part thereof.

The improved patch is octagonal in shape which facilitates mounting of the patch in a tire. There are no exposed raw edges of fabric to chafe the inner tube, and, because of its marginal flexibility, there will be no hinge action of the tire plies about any of the edges of the patch while the tire is in service. The patch is less expensive to manufacture than plural ply patches heretofore provided, and it achieves the other advantages set out in the foregoing statement of objects.

Modification may be resorted to without departing from the spirit of the invention or the scope of the appended claims, which are not limited wholly to the specific construction shown and described.

What is claimed is:

1. A patch for use in repairing tires, said patch comprising a group of parallel strips of rubberized fabric of a length greater than their width, a second group of parallel strips arranged at right angles to said first-named group to form a cross-shape, the parallel strips being of uniform size and offset from each other.

2. A patch for use in repairing tires, said patch comprising a plurality of parallel pairs of strips of rubberized fabric, having greater length than width, said strips being of uniform size throughout, and the pairs of strips being arranged at right angles to the other parallel pairs of strips, the respective parallel strips of each pair being offset from each other.

3. A patch for use in repairing tires, said patch comprising a plurality of pairs of parallel strips of rubberized cords having greater length than width, said strips being of uniform size throughout, and the pairs of strips being arranged at right angles to the other parallel pairs, the parallel strips of each pair of strips being laterally and longitudinally offset from each other.

4. A patch for use in repairing tires, said patch comprising a plurality of pairs of strips of rubberized cord fabric having greater length than width, said pairs of strips being arranged at right angles to the other parallel pairs of strips and having the centers of the respective strips offset from each other and symmetrically disposed about the center of the finished structure.

5. A tire repair patch comprising a plurality of strips of rubberized fabric secured together in cross formation to provide a central reinforcing pad and four anchoring ends extending therefrom, and a sheet of unvulcanized rubber on one face thereof, the corners of the sheet between said ends being folded upon themselves and upon the lateral marginal portions of said ends to provide a rubber binding for the raw edges of the rubberized fabric.

6. A tire repair patch comprising a plurality of strips of rubberized cords of identical size and shape and laminated in cross-wise relation to provide a central body portion and four anchoring ends extending therefrom, said ends being of graduated thickness to provide relatively thin and flexible marginal portions, and a sheet of unvulcanized rubber on one face of the patch, the corners of said sheet between said ends being folded upon themselves so as to overlie the lateral marginal portions of the ends to provide a rubber binding for the raw edges of the rubberized fabric.

ROBERT F. WILSON.